March 10, 1959  J. M. BERGE  2,877,119
METHOD OF AND MEANS FOR MAKING FRESH CHEESE
Filed May 24, 1954  3 Sheets-Sheet 1

March 10, 1959  J. M. BERGE  2,877,119
METHOD OF AND MEANS FOR MAKING FRESH CHEESE
Filed May 24, 1954 3 Sheets-Sheet 2
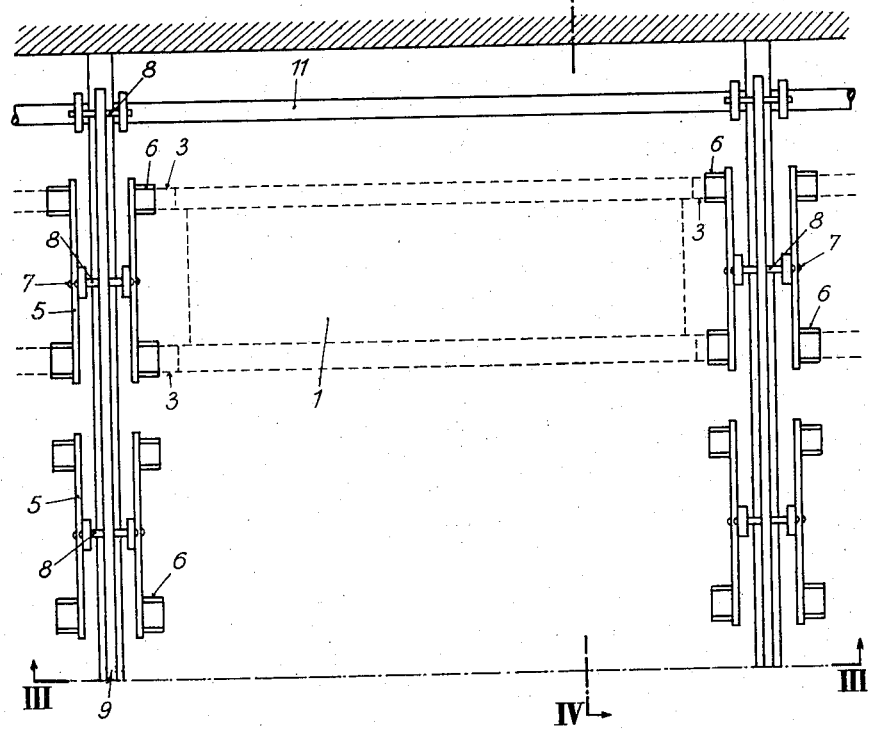
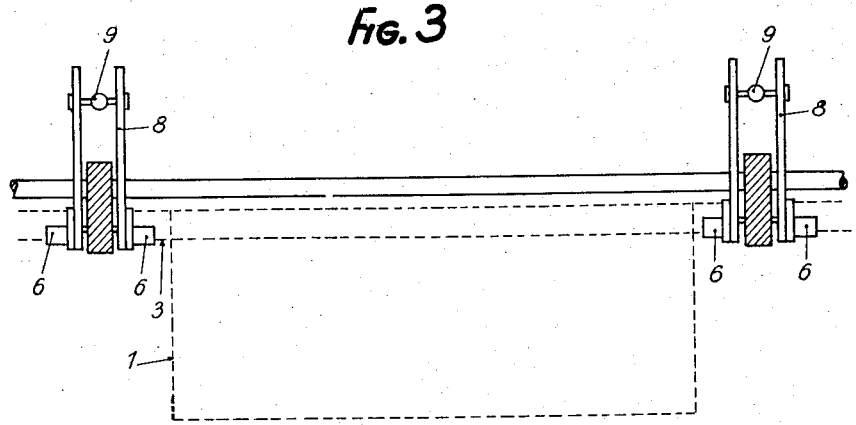

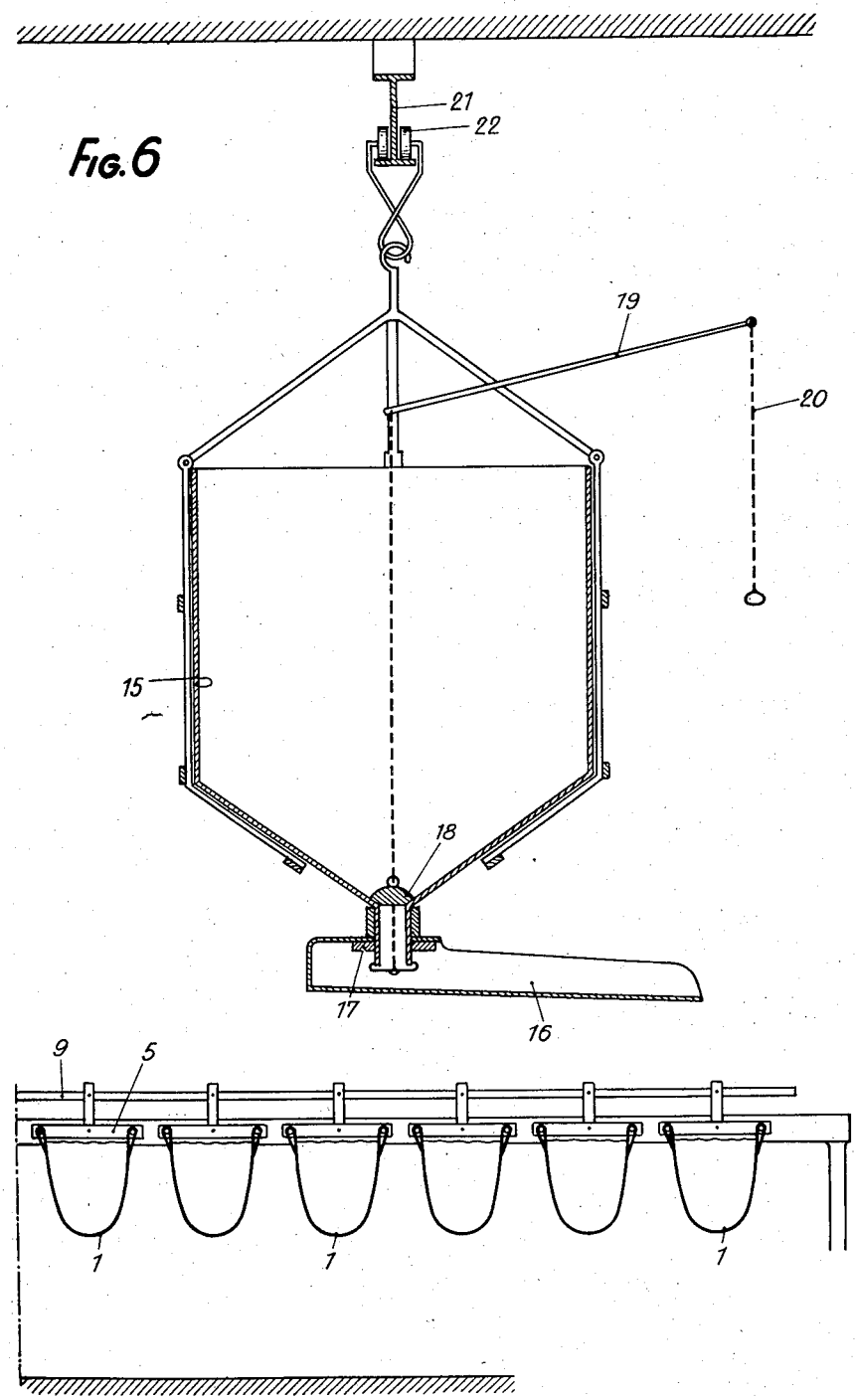

United States Patent Office 2,877,119
Patented Mar. 10, 1959

2,877,119

METHOD OF AND MEANS FOR MAKING FRESH CHEESE

Jacques M. Berge, Prechac, France

Application May 24, 1954, Serial No. 432,005

Claims priority, application France July 10, 1953

1 Claim. (Cl. 99—116)

This invention relates essentially to the preparation of unfermented cheese of the type known commercially under the general term of "fresh cheese."

According to the present practice, the curdled milk is poured into fabric sacks which are subsequently closed and suspended for draining. On the other hand, in view of properly washing the mass of curdled milk, so as to remove the acid substances therefrom, the contents of these sacks must be repeatedly washed and allowed to drain.

According to other methods, a faster draining is achieved through the use of presses, but in these methods it is also necessary to stop the draining operation for washing the draining curdled milk from time to time, in order to remove the acid substances therefrom, when it is contemplated to wash the curdled milk. Yet, in the practice this operation is so costly that it is never carried out. Moreover, the resulting cheese lacks freshness due to its passage in presses.

Therefore, all the hitherto known methods and devices are characterized by the serious drawback of requiring a long and costly handling.

It is the essential object of this invention to avoid the various drawbacks inherent to known methods of making fresh cheese and to provide a novel method of treating curdled milk remarkable notably in that it consists in pouring the milk curdled with rennet into open containers, preferably of the deformable-wall type, of trough or cradle configuration, having their bottoms and possibly their lateral walls made of a material pervious to liquids, and in allowing the cheese to drain therein without transferring it from one container to another.

The fact of utilizing open containers with deformable walls is advantageous firstly in that a perfect draining is obtained by submitting the mass of curdled milk contained therein to a reciprocating motion or, more simply, by so stirring this mass that the draining of any liquid contained therein will be promoted to a large extent. On the other hand, the fact of utilizing open containers of the character indicated hereinabove makes it possible to carry out a plurality of washing operations on the spot without having to handle the mass of curdled milk or extracting this mass from the container in which it is kept. In fact, the mere spraying of water over the top surface of the mass of draining milk will be sufficient to dilute the acid substances from this mass and cause them to drain off during the remaining draining period.

This invention is also concerned with a container for carrying out the method broadly set forth hereinabove, this container being characterized notably in that it consists of cloth or like pervious material secured to a substantially rigid frame structure so as to constitute an open trough or cradle of deformable cross-section.

According to one form of embodiment of the invention, the container consists of a cloth member connected along its longitudinal edges to a pair of tubes or rods and provided with end walls to form a trough or cradle assembly.

This invention is also concerned with a complete plant for carrying out the method broadly disclosed hereinabove, utilizing the trough- or cradle-like containers defined in the preceding paragraph.

Other characteristic features of the invention will appear as the following description proceeds with reference to the accompany drawings, wherein:

Figure 2 shows in plan view one portion of a plant equipped in accordance with the teachings of this invention;

Figure 3 is a section taken on the line III—III of Fig. 2;

Figure 6 is a cross-sectional view showing a plant made in accordance with this invention.

Figure 1:
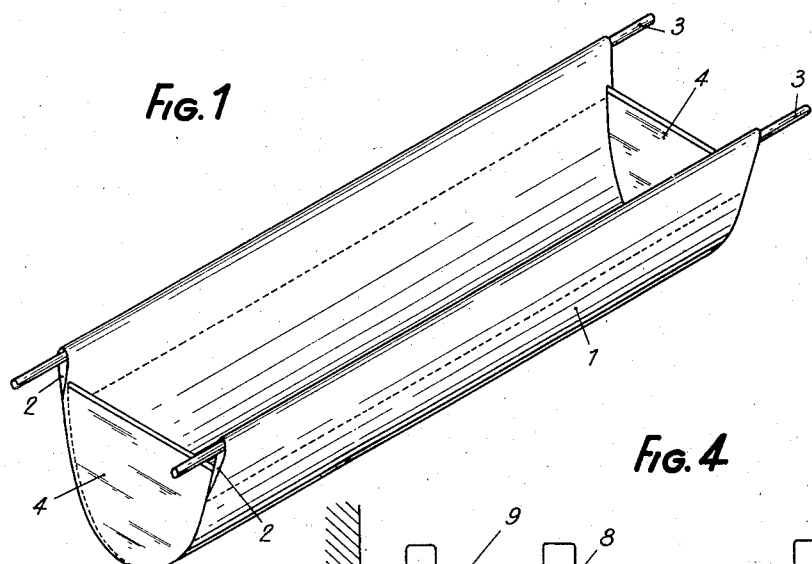
Figure 1 shows in isometric view a container according to this invention.

In the form of embodiment shown in Fig. 1 of the drawings, the container consists for example of a cloth 1 usually called "cheese-making cloth," having its two longitudinal margins 2 hemmed to form a pair of loops having threaded tubular or solid rods 3 therein, as shown. End walls 4, also of cloth or like material, are sewn so as to form a container of trough or cradle configuration. In the foregoing, it is stated that the material of which the body of the container 1 is made was cloth, but it will be readily understood that any other suitable material, provided that it is both pervious and deformable, may be used for the same purpose.

Figure 4:
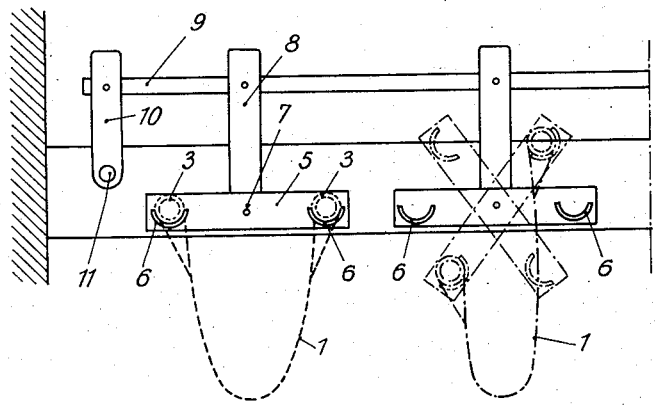
Figure 4 is a section taken along the line IV—IV of Fig. 2.
Figure 5:
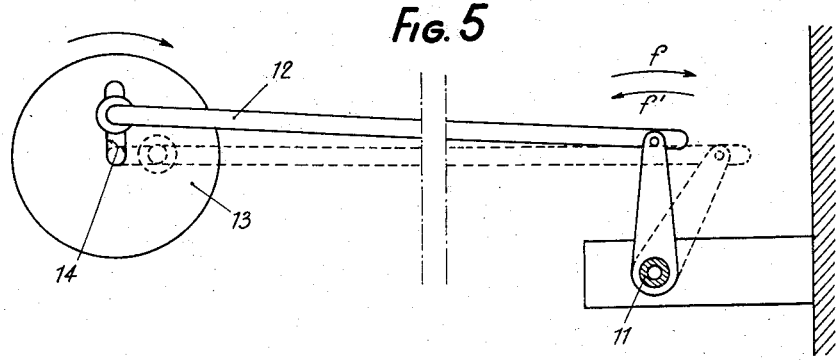
Figure 5 illustrates diagrammatically a crank-and-rod mechanism for driving the transmission shaft of the plant.

In order to upset the substance contained in a trough- or cradle-like container of the character defined hereinabove, it will be sufficient for example to alternately and successively raise the rods or bars 3, whereby the curdled milk therein will be upset automatically as it will be projected from one side to the other, that is, now to the left, now to the right (see Fig. 4).

Similarly, it is evident that any device adapted to spray water over the upper portion of the mass of material in a container of this type will disintegrate and wash the coagulated mass of curdled milk, without it being necessary to extract it from the container and submitting it to other operations, whatever they may be.

Figs. 2 to 5 illustrate a device and a plant for carrying out the method of this invention, by utilizing the container described hereinabove. In this example, each container is suspended from a rocker 5 incorporating supporting means in the form, for example, of half-circular projections 6. These supports 6 are adapted to receive the relevant ends of the rods or bars 3 of each container. Each rocker 5 is adapted to oscillate about an axis 7 through the provision of links 8 connected to a connecting rod 9 driven in turn by one or more connecting rods 10 actuated by a transmission shaft 11 (see Fig. 5). The transmission shaft 11 is reciprocated in the direction of the arrows f and f' (Fig. 5) by a main shaft 12 actuated by a crank consisting of a disk 13 formed with a radial slot 14 whereby the radial position of the driven end of shaft 12 on this disk may be adjusted to vary at will the amplitude of the oscillation performed by the shaft 11.

The operation of the device described hereinabove is very simple. In fact, the containers are firstly suspended from their relevant supports as shown in dotted lines in Figs. 2, 3 and 4. Then, a motor adapted continuously to rotate the disk-shaped crank 13 is started, thereby properly oscillating the transmission shaft 11. This movement is transmitted to the rod 9 and the latter causes the rockers 5 to be swung as shown in dotted lines in Fig. 4.

Fig. 6 illustrates by way of example a plant embodying the method and container described hereinabove. In this figure, 1 are the containers suspended from the rockers 5 actuated from the connecting rod 9. Overlying this set of containers is a hopper-shaped container 15 provided with a swivelling chute 16 secured to the bottom of the container 15 by means of a nut 17, for example. The container 15 is closed at its bottom end by a plug 18 suspended from one end of a rod 19 having its opposite end provided with a control cord or chain 20.

The upper portion of the container 15 is suspended through adequate means from a horizontal rail 21, these means comprising for example rollers 22, as shown. Thus, the container 15 may be moved at will along the rail for filling the various deformable and reciprocatable containers 1 either before actuating the latter or at any desired or suitable time during the draining operation.

Above the series of containers 1, there may be provided a device for spraying water in jet or rain form.

Of course, the various cradle-like containers utilized in a plant may be actuated or swung either simultaneously or separately, or the reciprocating motion may be imparted at alternate times to groups of containers, as desired.

Means may be provided for causing a jet of water to be projected onto the content of each container after draining the curdled milk to 30%, which is a matter of from 15 to 20 minutes, as a rule. These means may constitute a permanent or temporary (detachable) equipment in the plant and their actuation may be either continuous or intermittent. For instance, the jet of water may be sprayed directly from one to the other end of each container 1, in order to break up the mass of curdled milk and promote the removal of serum therefrom.

This operation may be repeated several times and during the interval the mass of curdled milk may be again properly drained.

What I claim is:

In a method of manufacturing fresh cheese, the steps consisting of pouring a curd into deformable containers having an open top and lateral and front walls and a bottom portion made of a water pervious deformable material, imparting to the said lateral walls a simultaneous alternate up and down substantially vertical displacement in order to impart to the curd mass, by said displacement a continuous internal twisting motion and simultaneously and intermittently spraying water on the upper surface of the curd through the said open top so that the curd is washed and drained simultaneously.

References Cited in the file of this patent

UNITED STATES PATENTS

| | | |
|---|---|---|
| 497,615 | Tench | May 16, 1893 |
| 567,522 | Turner | Sept. 8, 1896 |
| 821,334 | Buskit et al. | May 22, 1906 |
| 1,279,949 | Waterman | Sept. 24, 1918 |
| 1,475,398 | Kielsmeier | Nov. 27, 1923 |
| 2,025,213 | Mlollis | Dec. 24, 1935 |
| 2,064,403 | Barker | Dec. 15, 1936 |
| 2,165,005 | Petersen | July 4, 1939 |
| 2,366,553 | Petersen | Jan. 2, 1945 |

OTHER REFERENCES

Circular 445, University of Illinois, entitled Sweet-Curd Cottage Cheese, Urbana, Illinois, January 1936, pp. 7 and 8.

U. S. D. A. Farmers Bulletin 850, entitled How to Make Cottage Cheese on the Farm, August 1917, pp. 8 and 9.